Figure 1:
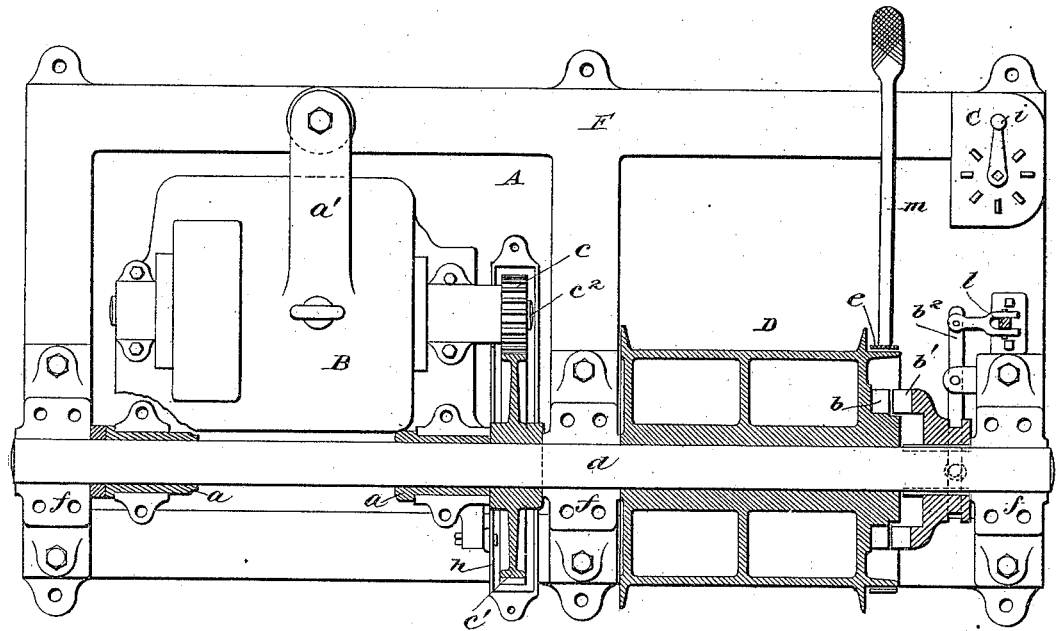

(No Model.)

W. B. LEWIS.
HOISTING MACHINE.

No. 600,729.  Patented Mar. 15, 1898.

Witnesses:  Inventor
Jas. F. Coleman  Warren B. Lewis
Jno. R. Taylor  by Rich'd N. Dyer
 Att'y.

THE NORRIS PETERS CO., PHOTO-LITHO., WASHINGTON, D. C.

UNITED STATES PATENT OFFICE.

WARREN B. LEWIS, OF PROVIDENCE, RHODE ISLAND.

HOISTING-MACHINE.

SPECIFICATION forming part of Letters Patent No. 600,729, dated March 15, 1898.

Application filed May 19, 1897. Serial No. 637,232. (No model.)

*To all whom it may concern:*

Be it known that I, WARREN B. LEWIS, a citizen of the United States, residing at Providence, in the county of Providence and State of Rhode Island, have invented certain new and useful Improvements in Hoisting-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to various new and useful improvements in electrical hoisting-machines.

An electrical hoisting-machine in order to commend itself to the public should possess certain characteristics. It should be simple in construction and efficient in operation. It should be so light and compact in the arrangement of its parts that it may be semi-portable, so that it may be moved from place to place. The motor should be capable of effective control both as to its speed and as to its direction of rotation. The drum should be so mounted and arranged with respect to the motor that it is practically unobstructed, whereby the cable may extend from the same in any desired direction. Provision should be made whereby when the load has been elevated the motor may be cut out and the drum retained under the control of the operator. There should be no lost motion and wear of the parts, as invariably is the case when friction-clutches are used. Drums of different and varying diameters should be capable of being applied to the hoist, whereby the available power may be increased without changing the capacity of the motor. The constituent elements of the hoist should be so assembled that they may be readily taken apart for repairs or for the substitution of new parts.

The electrical hoist forming the subject of the present invention possesses the characteristics above indicated, and it is therefore better suited for the purpose than any of the devices of this type at present in use.

In carrying out my invention I provide a suitable bed-plate made essentially rectangular, and hence of the cheapest possible construction. Mounted upon said bed-plate in suitable bearings is a horizontal shaft extending substantially the entire length of the bed-plate. An electric motor is hung upon this shaft near one end of the bed-plate in a manner similar to the suspension of electric motors at present employed for operating electric-railroad cars. The armature-shaft of said motor carries a pinion, which meshes with a gear keyed to the main shaft, and said gear and pinion are preferably incased, so as to be protected from dust and dirt and to also allow them to run in oil, whereby friction will be reduced to a minimum. Mounted loosely upon the main shaft, at one side of the motor, is an ordinary drum, which drum is adapted to be connected to or disconnected from the main shaft by means of an ordinary jaw-clutch. The speed and the direction of rotation of the motor are regulated by a suitable controlling device for the purpose—such, for instance, as are used at present for regulating the motors employed for propelling electric-railroad cars. Preferably the drum is provided with a suitable band friction-brake applied either by hand or by the foot of the operator and by means of which reverse motion of the drum may be allowed and controlled with perfect safety when the jaw-clutch is disconnected.

An electric hoist constructed in accordance with my invention possesses distinct and important advantages. By mounting the electric motor and the drum upon the same shaft a single main shaft alone is required. If said main shaft is carried in bearings having removable caps, as is preferable, it may be readily removed for any purpose, carrying the motor and drum with it, whereby repair of the parts or the substitution of new parts may be readily effected, and by reason of which also drums of different diameters may be mounted on the shaft. By arranging the motor at one end of the drum the latter is entirely unobstructed and the cable can be passed from either side thereof in any direction within a limit of one hundred and eighty degrees. Since with my improved hoisting device I employ a single main shaft, the loss of power due to working friction is correspondingly reduced, whereby the life of the apparatus is increased and the cost of maintenance correspondingly lessened. In most of the hoisting devices at present on the market the percentage of power employed to actuate the driving-shaft is materially increased by reason of the additional working friction consumed in maintaining the drum and its driving member in frictional contact while the load is being hoisted, thereby also increasing the wear of the mechanism. This objection is entirely overcome with my device, since the drum is connected to or disconnected from the main shaft by a jaw-clutch which does not consume power.

In order that my invention may be better understood, attention is directed to the accompanying drawings, forming a part of this specification, and in which—

Figure 2:
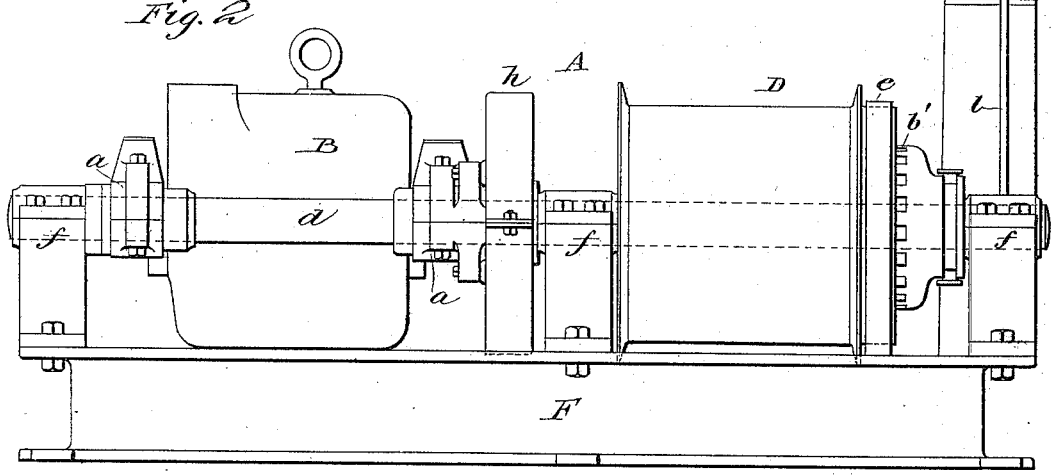

Figure 1 is a plan view of my improved electric hoisting-machine, and Fig. 2 a side elevation thereof.

A indicates my improved hoisting-machine in its entirety.

B is an electric motor of any approved design, that illustrated being a modern standard railway-motor in which the armature-shaft $c^2$ carries a driving-pinion $c$. The main or drum shaft $d$ extends longitudinally of the bed-plate and parallel with the armature-shaft of the motor B. The said drum-shaft is mounted in suitable bearings $f$, which are preferably provided with removable caps, whereby the drum-shaft may be removed when desired. The motor is provided with two rearwardly-extending brackets $a$, by which the motor will be hung upon the drum-shaft, and the desired parallelism of the armature-shaft with respect to the drum-shaft will be thereby secured. The motor is also provided with a front arm or bracket $a'$, which is bolted or otherwise secured to the base F. This base is essentially rectangular in shape and is made, preferably, of a single casting, so that it is of the simplest possible construction. Keyed to the drum-shaft is a gear-wheel $c'$, which meshes with the pinion $c$ on the armature-shaft of the motor. The said pinion and gear are preferably inclosed in a suitable casing $h$, the upper section being removable, as shown in Fig. 2. This casing not only protects the gearing by excluding dust and water, but it also serves as a reservoir for oil in which the gearing may run and by which the friction will be reduced to a minimum.

D represents a flanged drum upon which the rope or cable is wound, as is usual. This drum is loosely mounted on the shaft $d$ at one side of the motor, so that the drum is capable of rotation with respect to said shaft. One end of the drum is provided with one member of an ordinary jaw-clutch $b$, adapted to interlock with the corresponding clutch member $b'$, splined to and slidable upon the drum-shaft. Obviously when the parts are clutched together the drum will revolve in unison with its shaft.

$l$ indicates the shipper or hand lever, and $b^2$ the intermediate connection through which the jaw member $b'$ may be actuated, when desired, by means of said shipper or hand lever.

The drum is further preferably provided with a safety device or band-brake $e$, capable of being brought into action by depressing the treadle-lever $m$, as is common in the art. The motor is in a suitable electric circuit, in which is also placed a suitable controlling device C, located adjacent to the jaw-clutch and treadle-lever $m$, which controller is provided with a handle $i$, by which the speed and direction of rotation of the motor may be regulated, as will be understood. Preferably the controller C is carried on the bed-plate F, so that the entire device will be self-contained and semiportable.

In my improved electric hoisting-machine the movements of the drum in elevating and lowering the weight or load are easily and quickly regulated by the operator by manipulating the handle $i$ of the controller C, so as to vary the current and its direction through the motor. If desired, the load may be lowered by disconnecting the drum from the main shaft and by applying the band-brake $e$ by means of the treadle $m$, as is well known in the art.

I claim—

In an electric hoisting-machine, the combination of a base, a main shaft mounted in bearings on said base and extending substantially horizontal and parallel to the base, an electric motor having brackets supported by said shaft whereby the armature-shaft of said motor will be maintained in substantial parallelism with said main shaft, a pinion on the motor-shaft, a gear keyed to said main shaft and engaging with said pinion, a drum loosely mounted on said main shaft, a clutch for connecting and disconnecting said drum to and from said main shaft, and a controlling device for said motor carried on said base adjacent to said clutch, substantially as set forth.

In testimony whereof I have affixed my signature in presence of two witnesses.

WARREN B. LEWIS.

Witnesses:
 GEO. H. REMINGTON,
 REMINGTON SHERMAN.